(12) United States Patent
Cole et al.

(10) Patent No.: US 10,773,471 B2
(45) Date of Patent: Sep. 15, 2020

(54) COMPOSITE MANUFACTURING MACHINE

(71) Applicant: Bell Helicopter Textron Inc., Fort Worth, TX (US)

(72) Inventors: Russell S. Cole, Euless, TX (US); Billy Joe Benda, Arlington, TX (US); Pin-Lin Chiou, Arlington, TX (US); William Russell Cleary, Jr., Mansfield, TX (US); Mark A. Wiinikka, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 129 days.

(21) Appl. No.: 15/135,274

(22) Filed: Apr. 21, 2016

(65) Prior Publication Data
US 2016/0311178 A1 Oct. 27, 2016

Related U.S. Application Data

(60) Provisional application No. 62/150,536, filed on Apr. 21, 2015.

(51) Int. Cl.
| | | |
|---|---|---|
| *B29C 53/04* | (2006.01) | |
| *B29C 43/36* | (2006.01) | |
| *B29C 70/38* | (2006.01) | |
| *B29K 63/00* | (2006.01) | |
| *B29L 31/08* | (2006.01) | |
| *B29K 105/08* | (2006.01) | |
| *B29K 307/04* | (2006.01) | |

(52) U.S. Cl.
CPC .......... *B29C 70/38* (2013.01); *B29C 43/3697* (2013.01); *B29C 53/043* (2013.01); *B29K 2063/00* (2013.01); *B29K 2105/0881* (2013.01); *B29K 2307/04* (2013.01); *B29L 2031/082* (2013.01)

(58) Field of Classification Search
CPC .... B29C 70/38; B29C 53/043; B29K 2063/00
USPC ........................................................ 264/320
See application file for complete search history.

(56) References Cited

U.S. PATENT DOCUMENTS

| | | | | |
|---|---|---|---|---|
| 2,420,119 A | * | 5/1947 | Boehm | B27H 1/00 144/267 |
| 3,009,201 A | * | 11/1961 | Hansen | B29C 53/043 156/486 |
| 6,114,012 A | * | 9/2000 | Amaoka | B29C 70/30 244/119 |
| 7,384,255 B2 | * | 6/2008 | LaBossiere | B29C 64/106 226/187 |
| 9,308,992 B2 | | 4/2016 | Cabrera | |
| 9,889,610 B2 | * | 2/2018 | DesJardien | B29C 70/504 |
| 9,969,120 B2 | * | 5/2018 | Hausl | B29C 55/06 |
| 2006/0203332 A1 | * | 9/2006 | Shimotsuma | B29C 41/36 359/455 |

* cited by examiner

*Primary Examiner* — Robert C Dye
*Assistant Examiner* — Russell E Sparks
(74) *Attorney, Agent, or Firm* — Lightfoot & Alford PLLC

(57) ABSTRACT

A composite manufacturing system has a tool having a substantially planar first portion and a substantially planar second portion, a first carriage configured to carry a first roller that is configured to selectively apply pressure to the first portion, a second carriage configured to carry a second roller that is configured to selectively apply pressure to the second portion, and the first carriage and the second carriage are movable relative to the tool.

9 Claims, 19 Drawing Sheets

COMPOSITE MANUFACTURING MACHINE

CROSS-REFERENCE TO RELATED APPLICATIONS

This patent application claims the benefit of the filing date of the U.S. Provisional Patent Application Ser. No. 62/150,536, filed on 21 Apr. 2015 and entitled "Composite Manufacturing Machine," the entire content of which is hereby expressly incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some composite parts are constructed using manual layup of material plies. The manual laying up and compression of parts is time consuming and labor intensive. Some composite parts are constructed using one or more multi-axis layup dispenser heads that dispense small strips of material and automatically wipe and/or compress in the same direction as the strips of material are laid down. In some cases, a grip can be constructed by manually placing layers of material on a tool that has an outer portion that has a substantially similar shape to the inner portion of the grip. Once the layers of material are placed on the tool, the composite can be cured with heat and pressure. Once cured, a final grip shape can be machined out of the cured composite material. Creating a grip by manually placing the layers of material on the tool and manually compressing and/or wiping the layers of material is time consuming and prone to human error.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
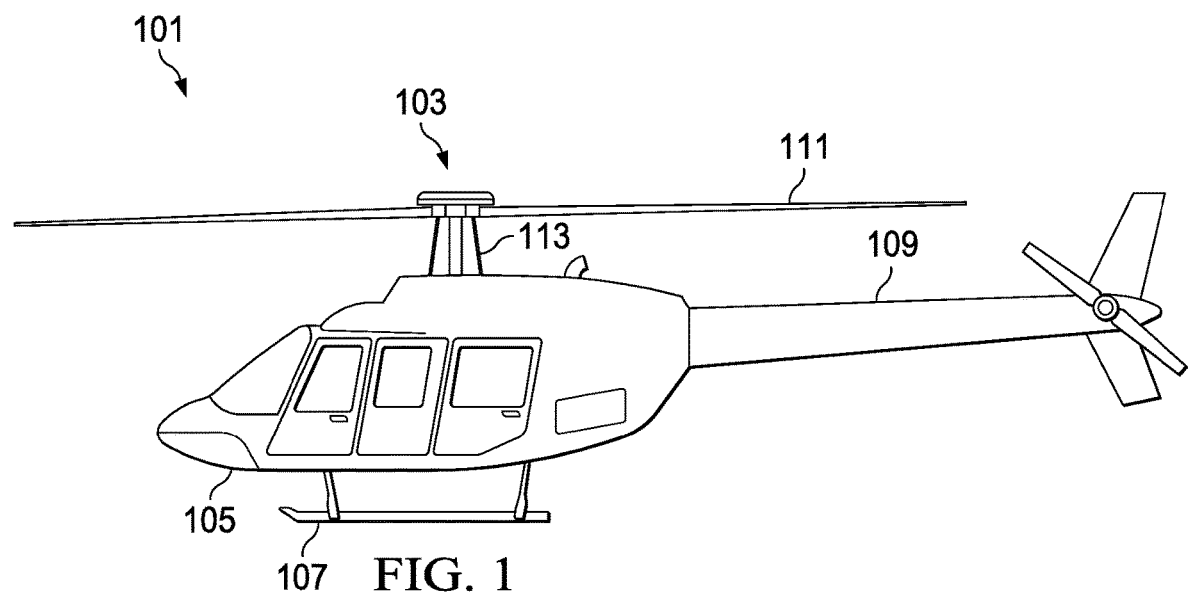
FIG. 1 is a view of a rotorcraft comprising a part constructed using the systems and methods of this disclosure.

Referring to FIG. 1 in the drawings, a rotorcraft 101 is illustrated. Rotorcraft 101 has a rotor system 103 with a plurality of rotorblades 111. The pitch of each rotorblade 111 can be selectively controlled in order to selectively control direction, thrust, and lift of rotorcraft 101. Rotorcraft 101 further comprises a fuselage 105, landing gear 107, and a tail member 109. In this embodiment, one or more components of the rotor system 103 can comprise a component manufactured using systems and methods disclosed herein.

Figure 2:
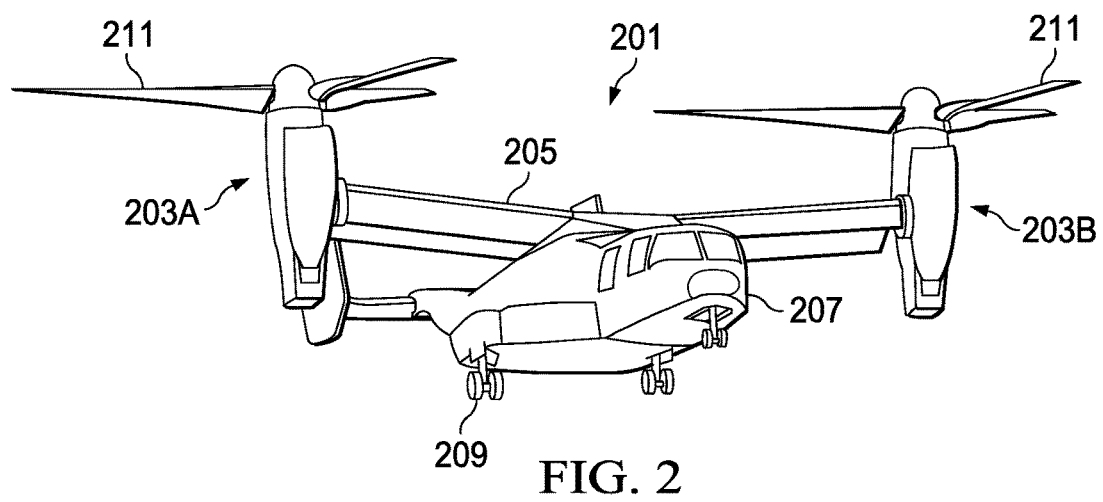
FIG. 2 is a view of a tiltrotor aircraft comprising a part constructed using the systems and methods of this disclosure.

Referring to FIG. 2 in the drawings, a tiltrotor aircraft 201 is illustrated. Tiltrotor aircraft 201 comprises a fuselage 207, a landing gear 209, a wing 205, and rotatable nacelles 203A and 203B. Each nacelle 203A and 203B comprises a plurality of rotor blades 211. The position of nacelles 203A and 203B, as well as the pitch of rotor blades 211, can be selectively controlled in order to selectively control direction, thrust, and lift of tiltrotor aircraft 201. In this embodiment, one or more components carried by nacelles 203A, 203B can comprise a component manufactured using systems and methods disclosed herein.

Figure 3:
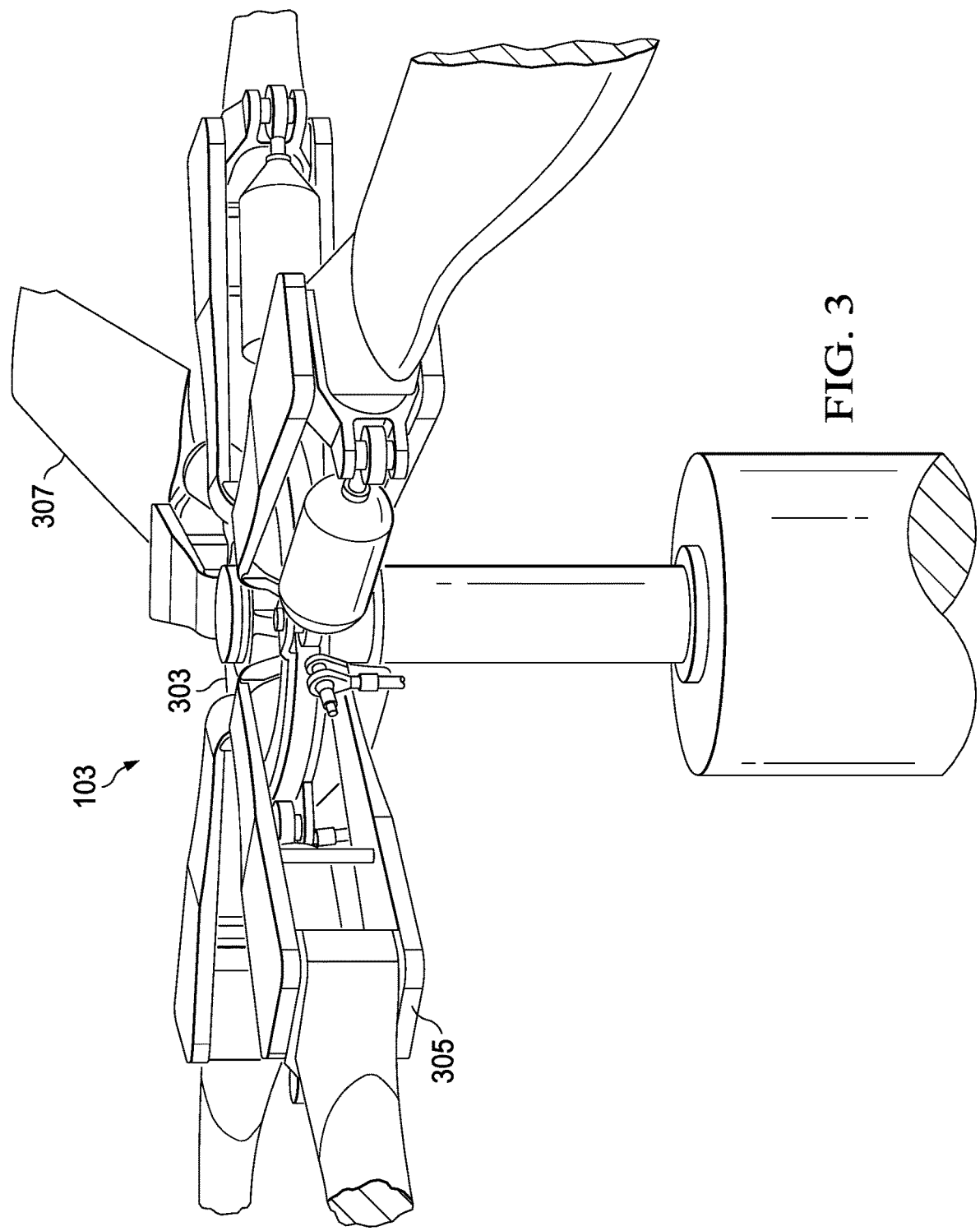
FIG. 3 is a view of a rotor system comprising a part constructed using the systems and methods of this disclosure.

Referring to FIG. 3 in the drawings, a rotor system 103 is illustrated. Rotor system 103 comprises a yoke 303, grips 305, and blades 307. In some examples, rotor system 103 may include more or fewer components. For example, rotor system 103 can further comprise components such as a gearbox, a swashplate, drive links, drive levers, and other components that can be incorporated. In this embodiment, one or more components of the rotor system 103 can comprise a component manufactured using systems and methods disclosed herein. More specifically, the grips 305 can comprise a component manufactured using systems and methods disclosed herein.

Some components of rotorcraft 101 and tiltrotor aircraft 201 can be manufactured with composite systems and this can be advantageous since composite components are typically very weight efficient. Illustrative composite components can comprise: wings, blades, spars, rotor grips, rotor hubs, compartments, and flooring, among others. The systems and methods of this disclosure can be utilized to manufacture composite components for rotorcraft 101 and tiltrotor aircraft 201, as well as other aircraft. One composite component for rotorcraft 101 and tiltrotor aircraft 201 is the grip 305. It should be appreciated that the systems and methods of this disclosure can be utilized to manufacture composite components of other types of aircraft, as well as non-aircraft applications. For example, the systems and methods of this disclosure can be utilized to manufacture composite components of a wind turbine, space vehicle, ground vehicle, surface marine vehicle, amphibious marine vehicle, and submersible marine vehicle, among other applications. Grip 305 is configured for attachment to both yoke 303 and blade 307. Grip 305 may comprise a composite such as an epoxy resin-impregnated carbon fiber unidirectional tape, sheet, and/or ply.

Figure 4:
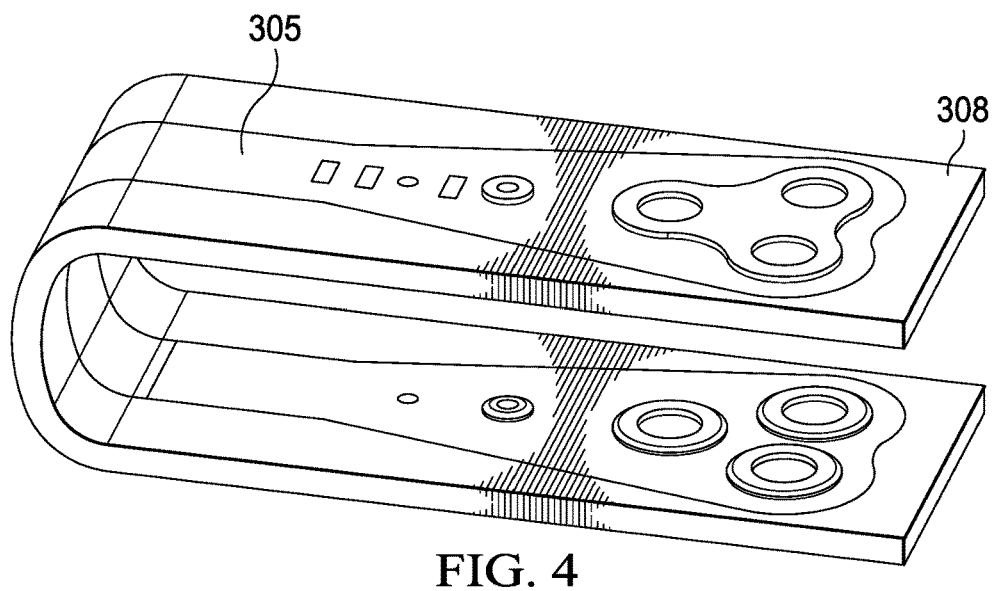
FIGS. 4 and 5 are views of a part blank constructed using the systems and methods of this disclosure.
Figure 5:
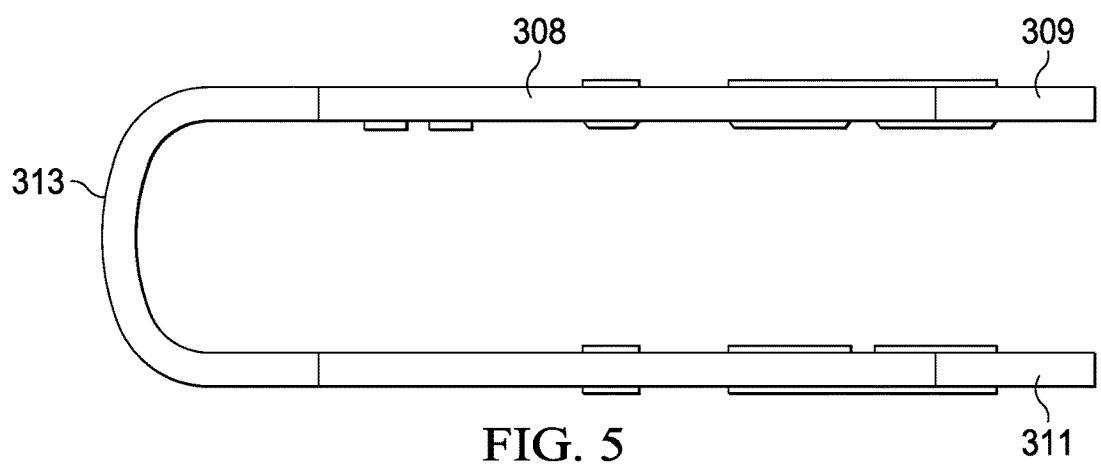
Figure 6:
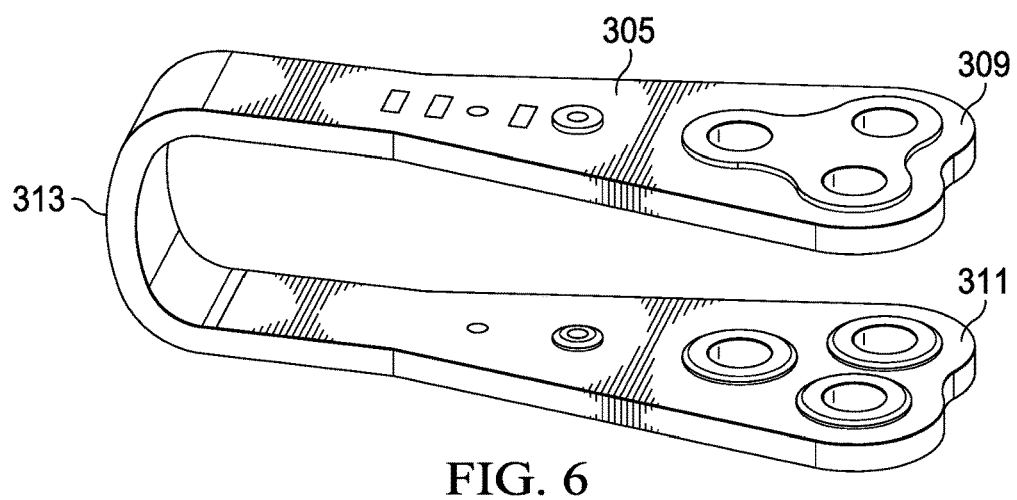
FIG. 6 is a view of a part constructed using the systems and methods of this disclosure.

Referring now to FIG. 4, a grip 305 is shown as being integral to a part blank 308 that can be constructed using the systems and methods disclosed herein. The part blank 308 and the grip 305 generally comprise a substantially plate-like first portion 309 and a substantially plate-like second portion 311 joined together by substantially U-shaped or C-shaped curved portion 313. In this embodiment, the grip 305 and the part blank 308 comprises a substantially constant material thickness and the first portion 309 is substantially parallel to the second portion 311.

Now referring to FIGS. 7-22, a composite manufacturing system 400 is shown. The system 400 can be used to manufacture a composite component, such as part blank 308. The part blank 308 can subsequently be cured and machined to yield a component, such as, but not limited to, a grip 305. System 400 generally comprises a table 402, a machine 404, and a stand 406. The table 402 comprises a sliding tray 408 configured to receive one or more sheets of material used for constructing composite components. In some embodiments, the sheets of material may initially comprise removable protective coatings and/or backings that can be manually removed by a user prior to placing the material on the tray 408. The tray 408 may comprise channels and/or rails and/or may otherwise be configured with rolling elements to allow a user to slide the tray 408 toward and away from the machine 404.

The stand 406 generally comprises a movable cart configured to vertically support a tool 410 that is configured to receive layers of material, such as the material selectively placed on the tray 408. An exterior of the tool 410 is substantially complementary to an interior shape of the part blank 308. The exterior of the tool 410 generally comprises a substantially planar first portion 412, a substantially planar second portion 414, and a curved portion 416 that joins the planar portions 412, 414. In some embodiments, an exterior portion of tool 410 can be manufactured out of any suitable material that has a low coefficient of thermal expansion, such as Invar.

The machine 404 generally comprises a frame 418 that vertically supports a first carriage 420 and a second carriage 422. The first carriage 420 and the second carriage 422 are vertically movable relative to the frame 418. In this embodiment, the first carriage 420 is vertically movable independent of the second carriage 422 so that the first carriage 420 and the second carriage 422 can be moved along a vertical length of the frame 418 independently. In some embodiments, one or more drive systems 424 are provided to cause the vertical movement. In this embodiment, the drive systems 424 may comprise a motor and an associated worm gear associated with complementary components carried by the carriages 420, 422. The machine 404 further comprises a first roller 426 carried by the first carriage 420 and a second roller 428 carried by the second carriage 422. The first roller 426 is pivotally attached to the first carriage 420 using pivot blocks 430. Similarly, the second roller 428 is pivotally attached to the second carriage 422 using pivot blocks 430. The pivot blocks 430 are attached to the carriages 420, 422 at lower hinge locations. The pivot blocks 430 of the first carriage 420 are also attached at higher hinge locations to a piston of an actuator 432 that is carried by the first carriage 420. Similarly, the pivot blocks 430 of the second carriage 422 are also attached at higher hinge locations to a piston of an actuator 432 carried by the second carriage 422. In this embodiment, each carriage 420, 422 carries a single roller, two pivot blocks, and two actuators. In alternative embodiments, actuators 432 can comprise any device that is configured to convert energy into linear motion from electric current, hydraulic fluid pressure, and/or pneumatic pressure, or any other suitable source of energy or force. Rollers 426, 428 can comprise a cylindrical component that is configured to apply pressure to the tool 410 by applying pressure to one or more layers of material carried by the tool 410. In this embodiment, the rollers 426, 428 comprise steel, but in alternative embodiments, the rollers can comprise any other suitable material.

Figure 7:
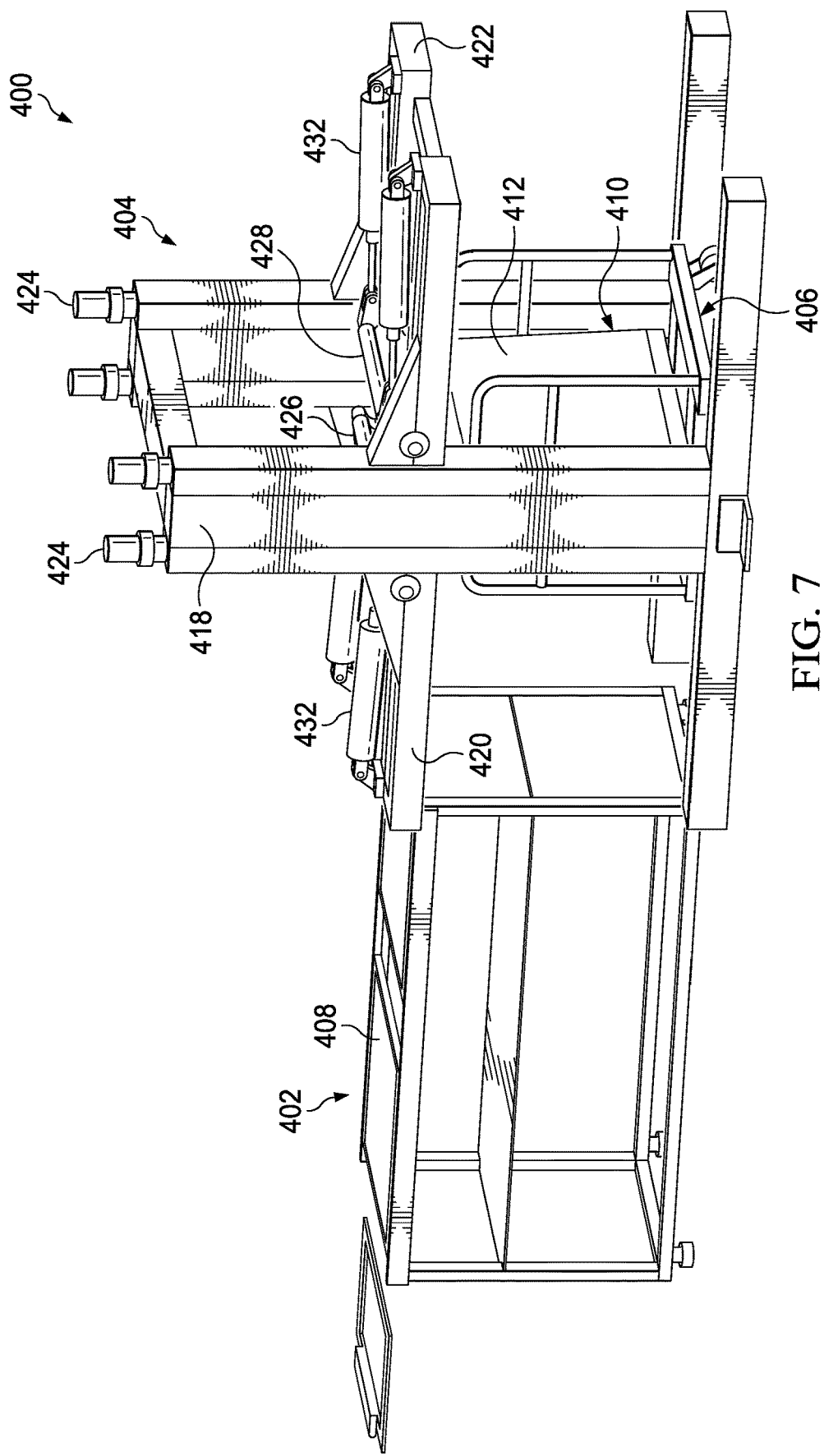
FIGS. 7-18 are views of a composite manufacturing system of this disclosure in various stages of operation.
Figure 8:
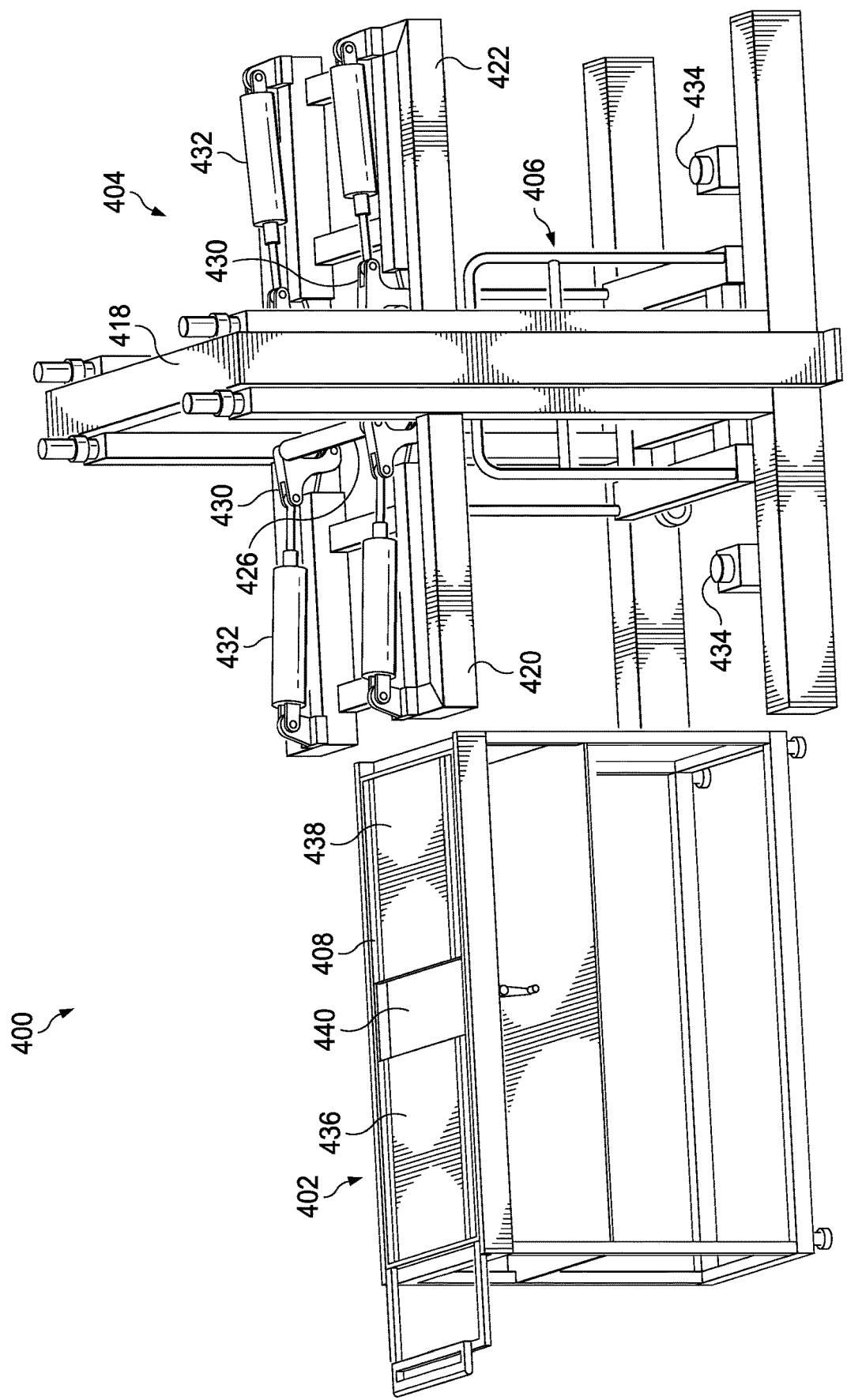

Referring now to FIGS. 7 and 8, the system 400 is shown in an initial unloaded state in which there is no material carried by the table 402, the carriages 420, 422 are in a position vertically higher than the tray 408, and there is no material on the tool 410. A method of constructing a composite part utilizing the system 400 can begin by configuring system 400 as shown in FIGS. 7 and 8.

Figure 9:
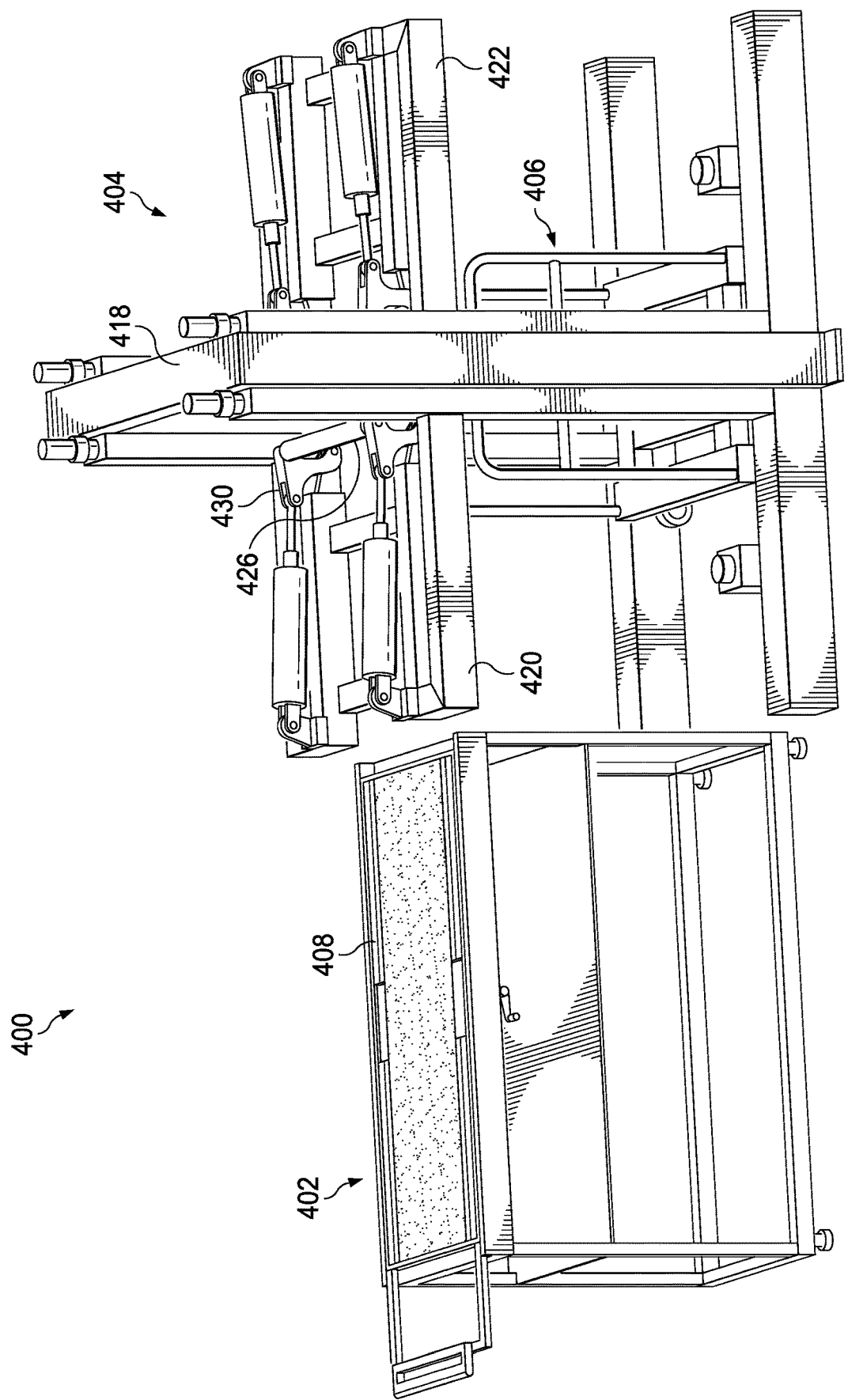

The method can continue as shown in FIG. 9 by loading one or more sheets of material onto the tray 408. Installing the sheets of material may be preceded by placing a layer of teflon tape onto the tray 408 so that fiberglass material sheets or layers and carbon material sheets or layers are less likely to adhere to the tray 408. The carbon sheets or layers may comprise unidirectional epoxy resin-impregnated carbon fiber and may be placed on top of a fiberglass ply. In some embodiments, one or more protective backings can be removed from the material before the material is placed on the tray 408 and/or after the material is placed on the tray 408. The tray 408 comprises a first support 436 and a second support 438 that are laterally movable with the tray 408. A lateral space between the first support 436 and the second support 438 is selectively filled by a vertically movable central support 440 that remains connected to the table 402. In some cases, the protective backing can be a reflective metallic material and/or light colored material. As such, in some embodiments, one or more backing detection systems 434 (see FIG. 8) can be provided to provide visual and/or audible alerts and/or to halt operation of the system 400 in response to a backing material being optically detected on the tray 408 and or in the machine 404. In this embodiment, the backing detection system 434 is configured to monitor presence of a backing when the tray 408 is carried by the frame 418.

Figure 10:
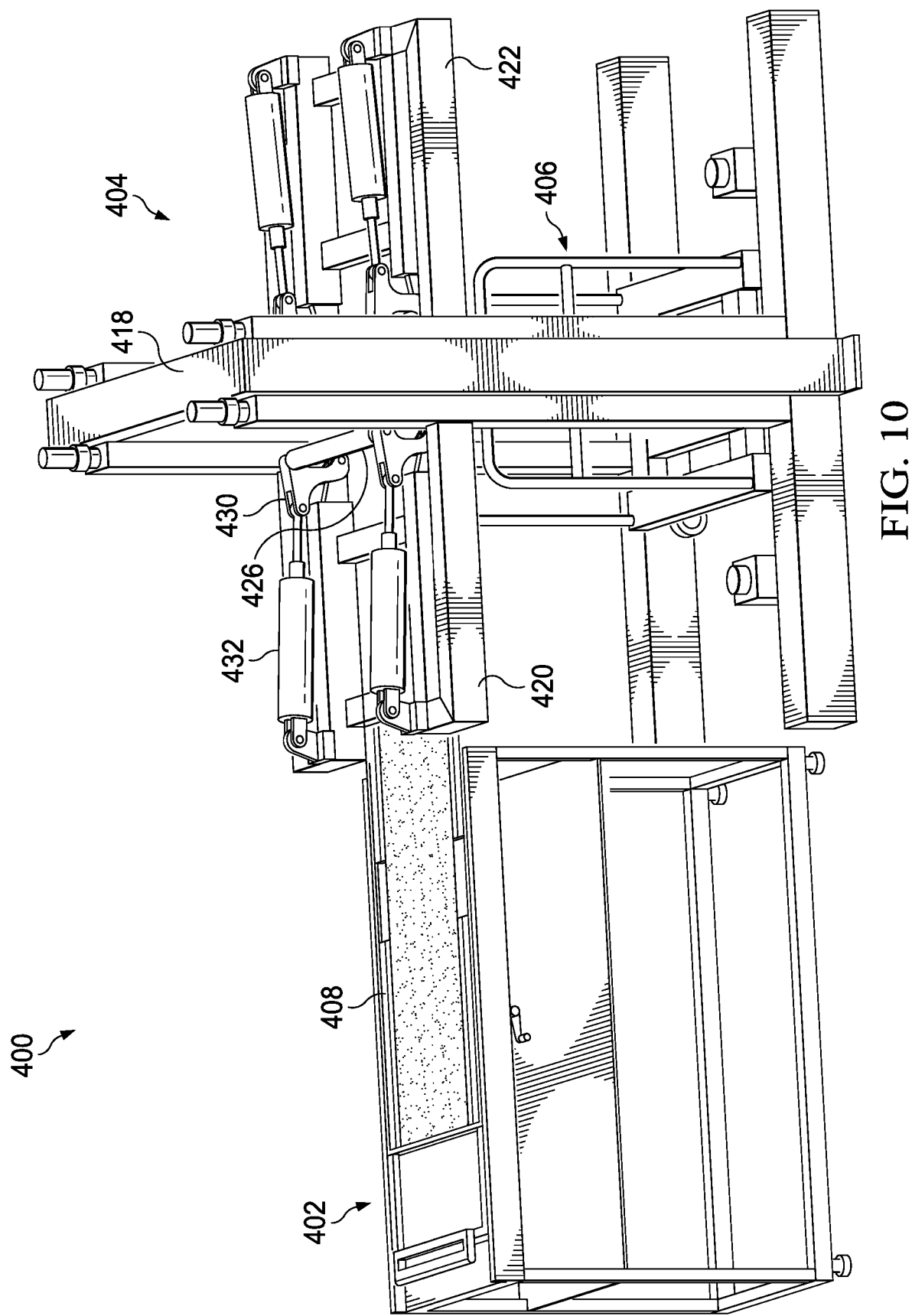
Figure 11:
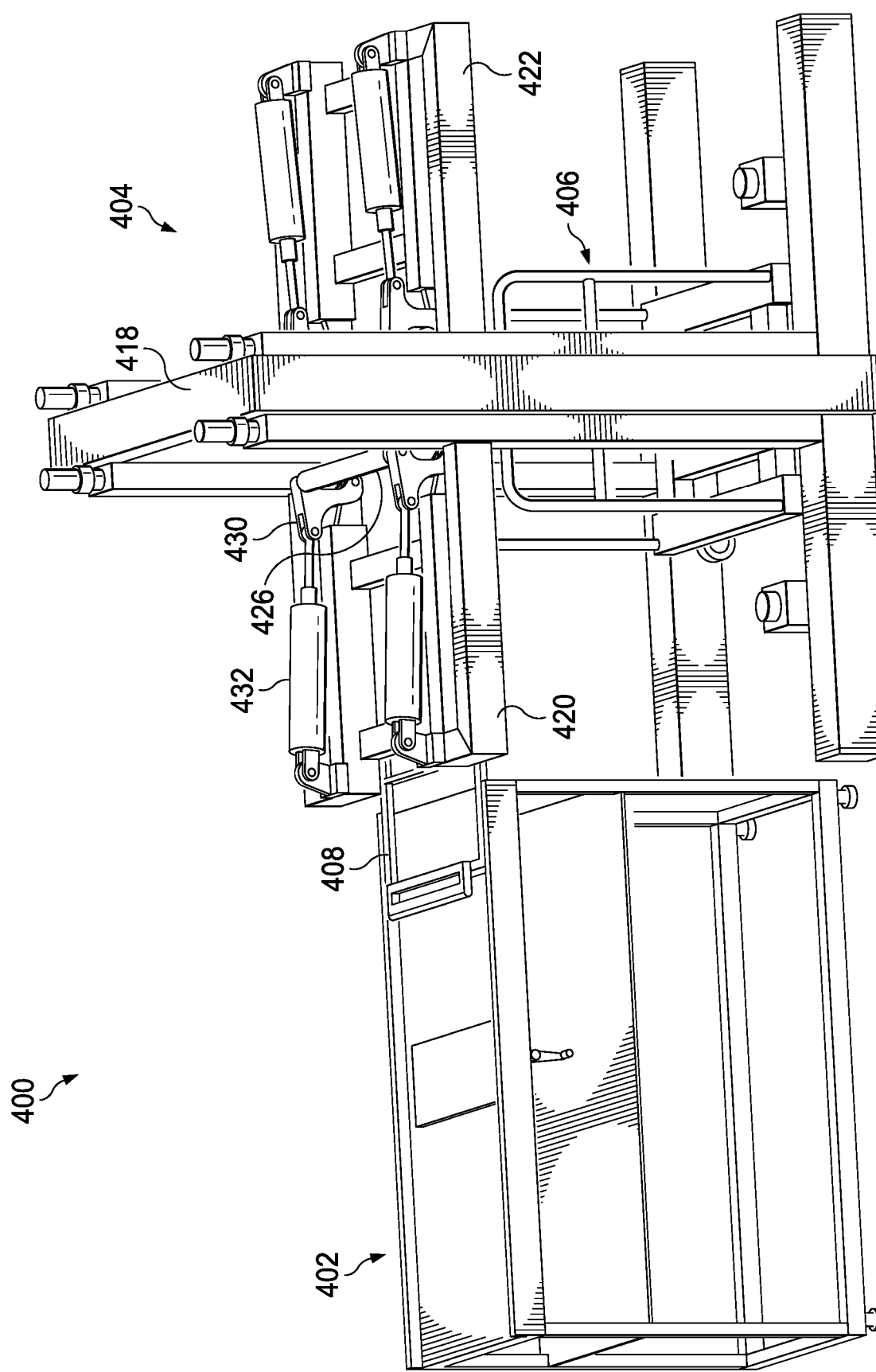
Figure 12:
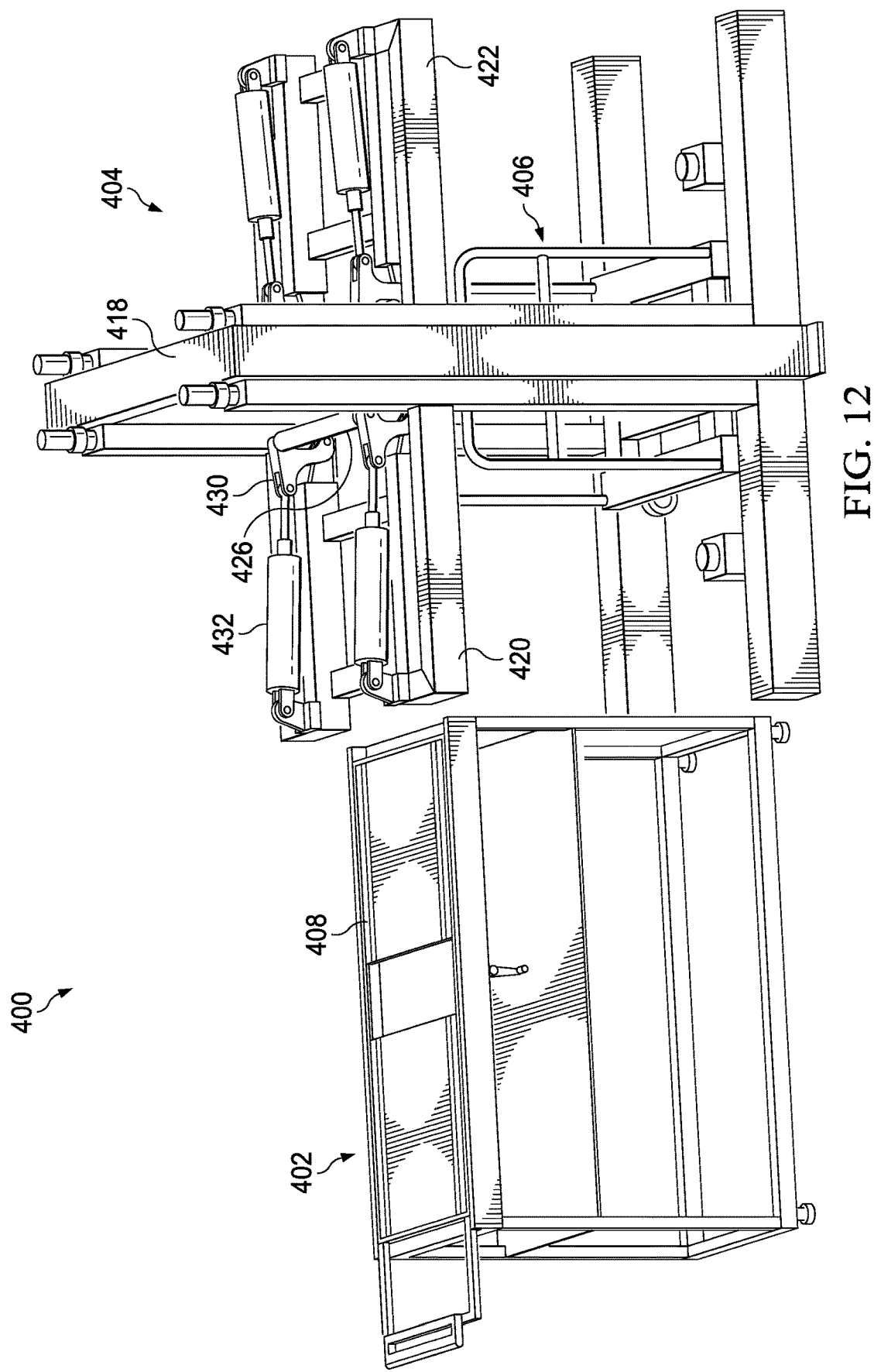

The method can continue as shown in FIG. 10 by first lowering the central support 440 to not impede movement of the tray 408 and sliding the loaded tray 408 from a position where the tray 408 is supported by the table 402 alone to an intermediate position where the tray 408 is supported by both the table 402 and the frame 418. The method can continue as shown in FIG. 11 by continuing to move the tray 408 into a position where the tray 408 is completely supported by the frame 418. Next, as shown in FIG. 12, the tray 408 is retracted but leaving the material sheet(s) supported by the first support 436 and second support 438 and also leaving the first support 436 and second support 438 supported by the frame 418 in positions below the first carriage 420 and second carriage 422, respectively.

Figure 13:
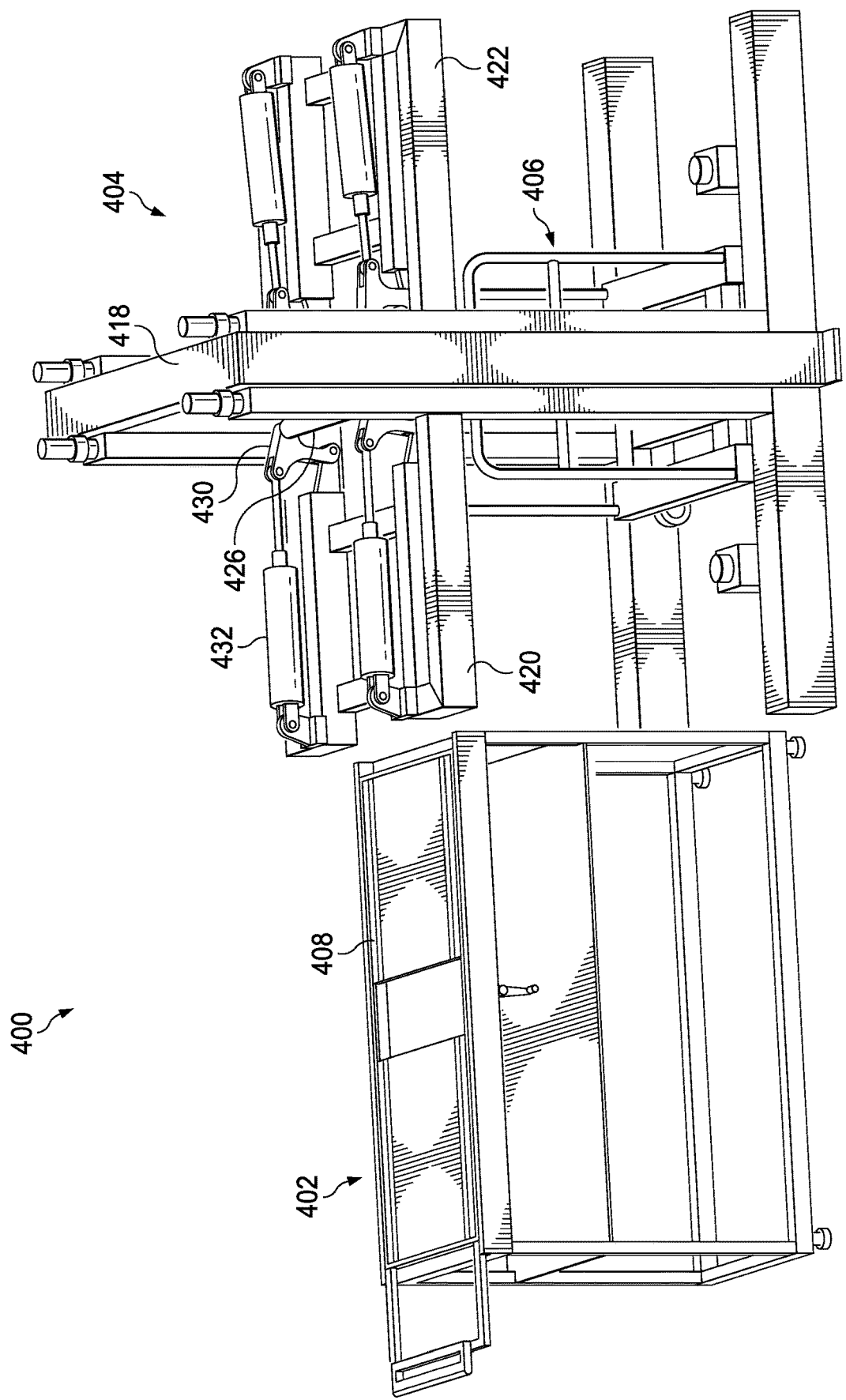
Figure 14:
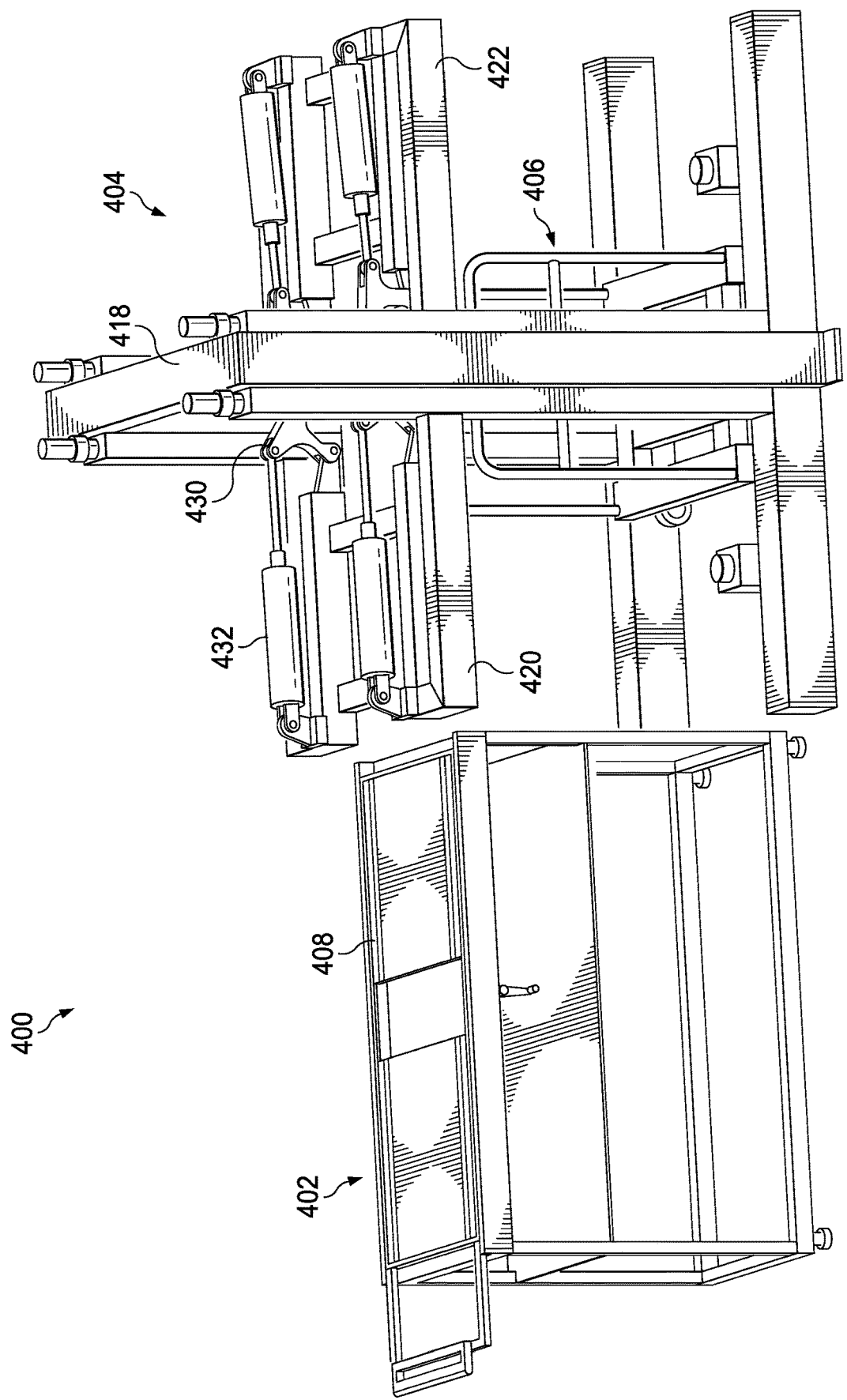
Figure 15:
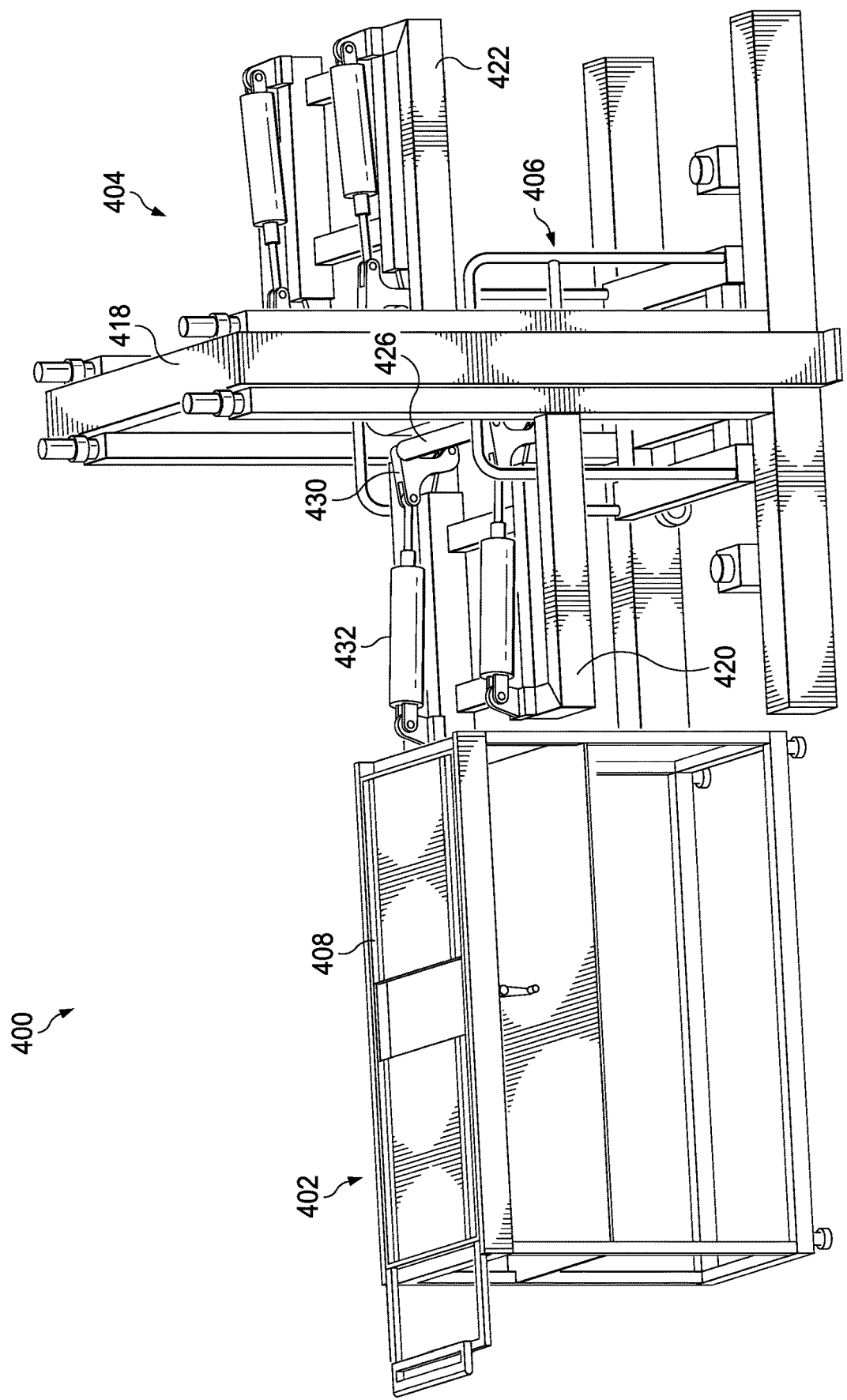

Next, as shown in FIG. 13, the first carriage 420 can be lowered and the actuators 432 of the first carriage 420 can be actuated to move the first roller 426 into contact with the material layer(s) as they apply pressure to the tool 410. In this embodiment, the first roller 426 can apply pressure to the curved portion 416 of the tool 410 at a location laterally beyond a lateral midline of the tool 410 and then move laterally back and along the tool 410 toward the first portion 412 of the tool 410 as the first carriage 420 is moved vertically downward. FIGS. 13-15 show that the first carriage 420 can be moved independent of the second carriage 422 and that the first roller 426 can compact and/or otherwise apply pressure to the material laid on the tool 410. FIG. 15 shows that after significant downward movement of the first carriage 420, the actuators 432 of the second carriage 422 can be actuated to cause the second roller 428 to apply pressure to the material laid on the tool 410. In some embodiments, the second roller 428 can apply pressure to the curved portion 416 of the tool 410 at a location laterally beyond a midline of the tool 410 and then move laterally back and along the tool 410 toward the second portion 414 of the tool 410 as the second carriage 422 is moved vertically downward.

Figure 16:
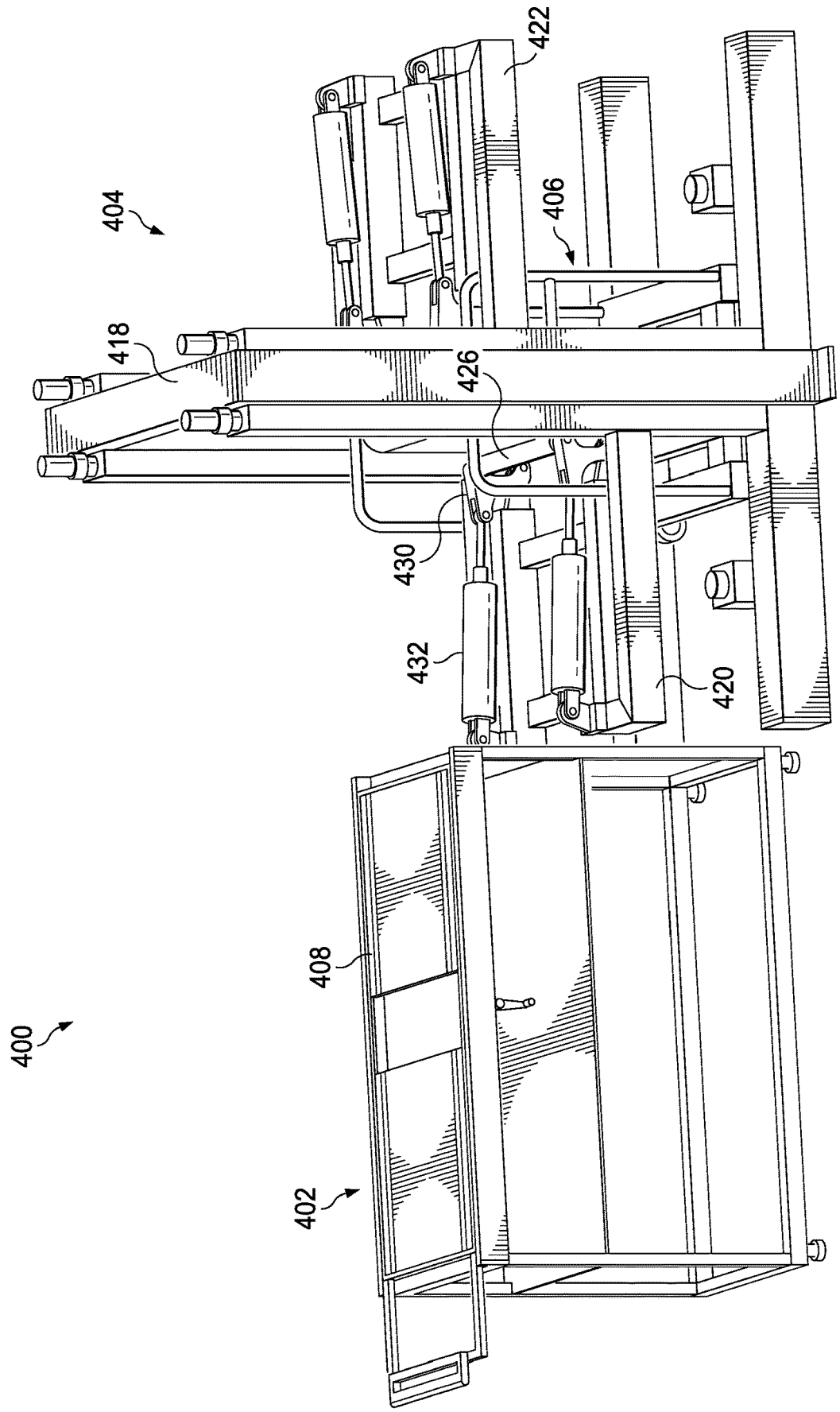
Figure 17:
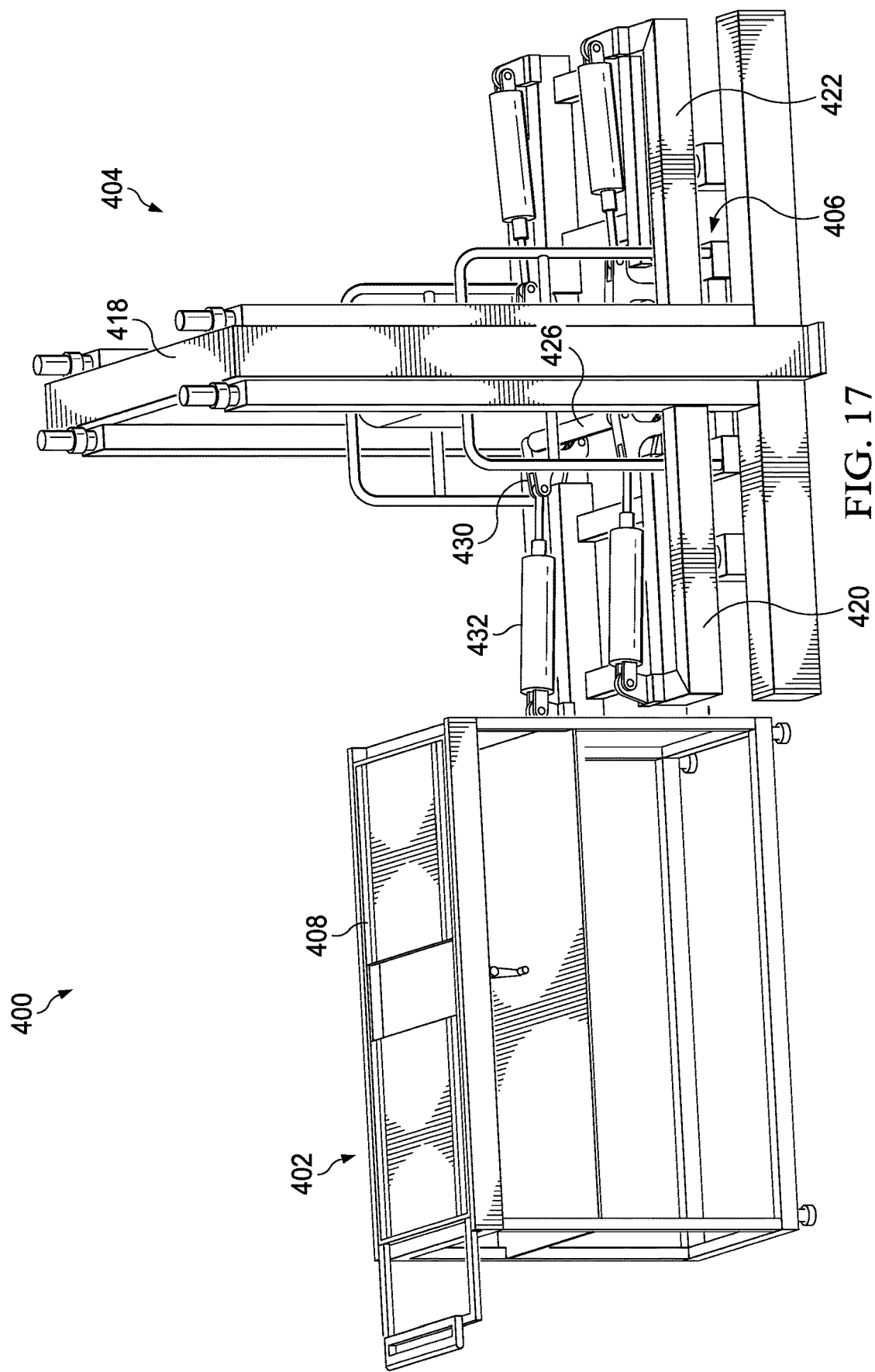
Figure 18:
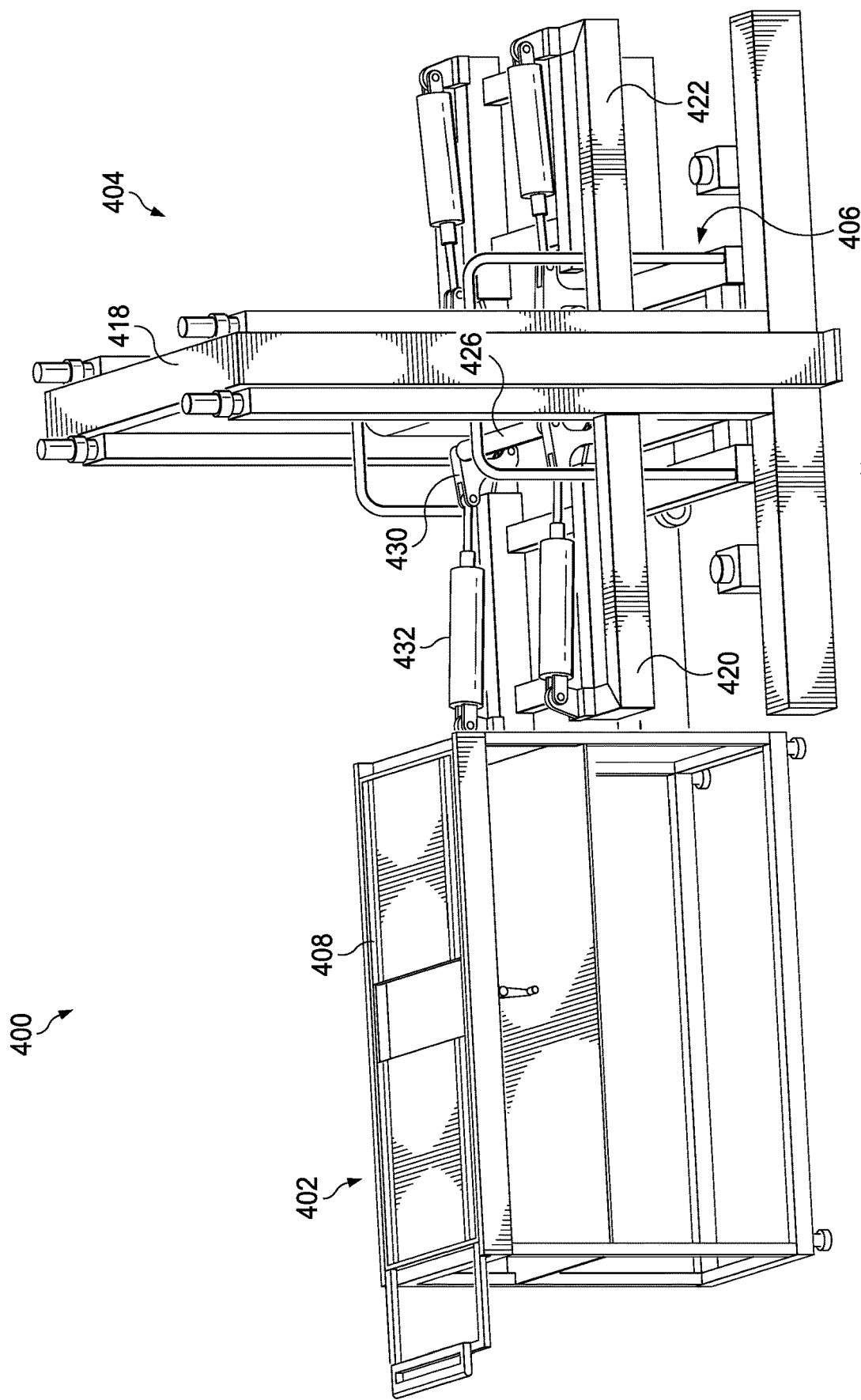
Figure 19:
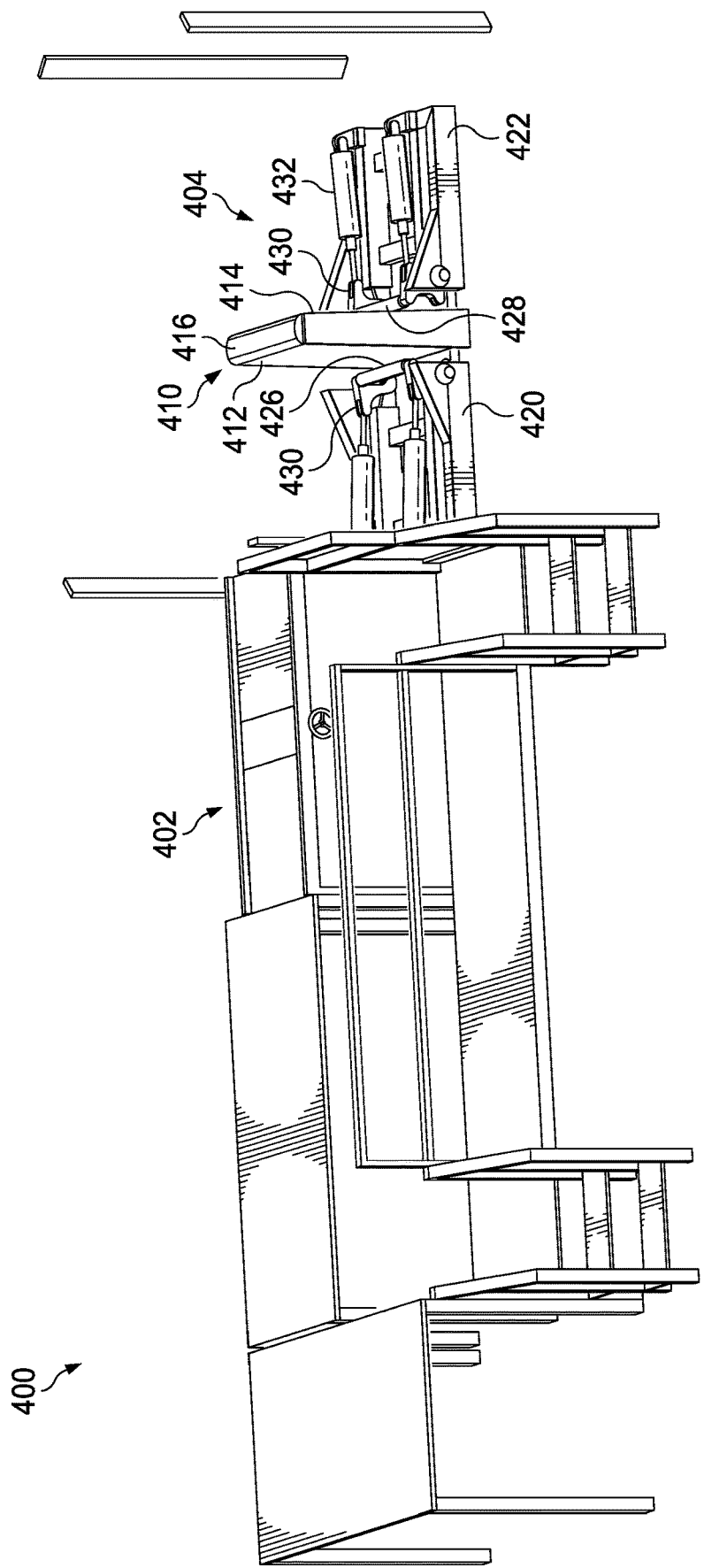
FIGS. 19 and 20 are partial views of the composite manufacturing system of FIG. 7, more clearly showing the location of a tool within the composite manufacturing system.
Figure 20:
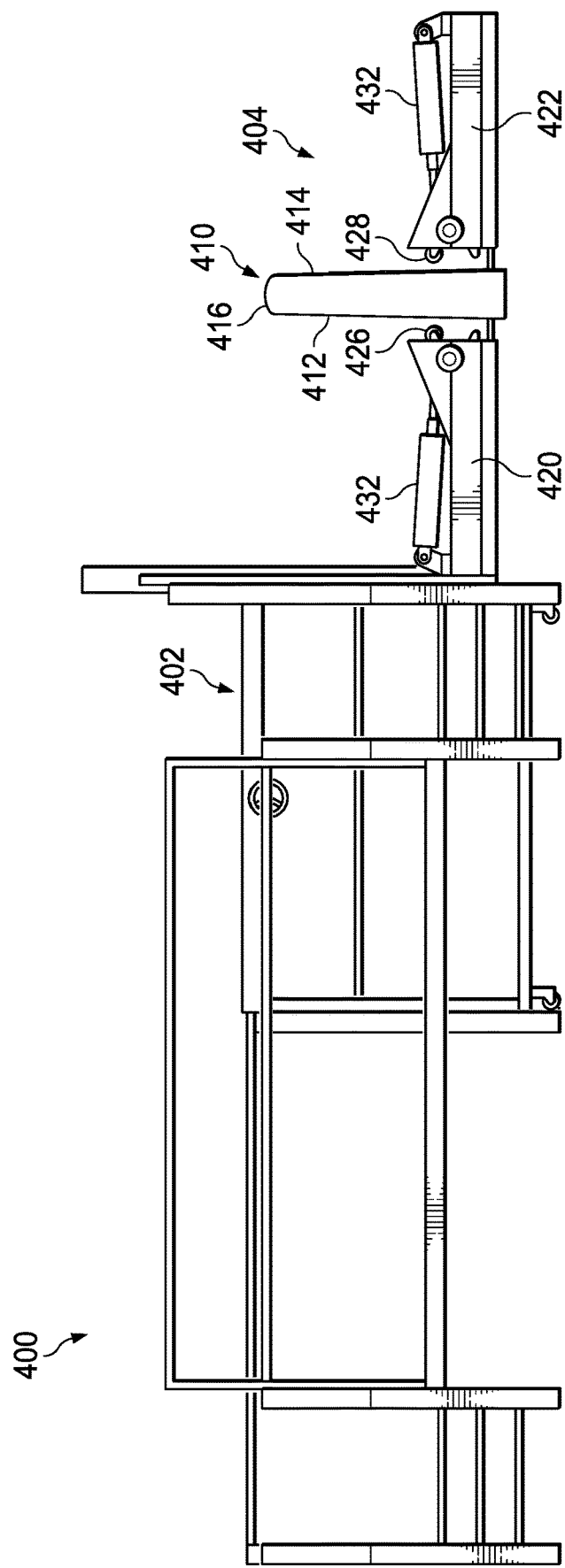
Figure 21:
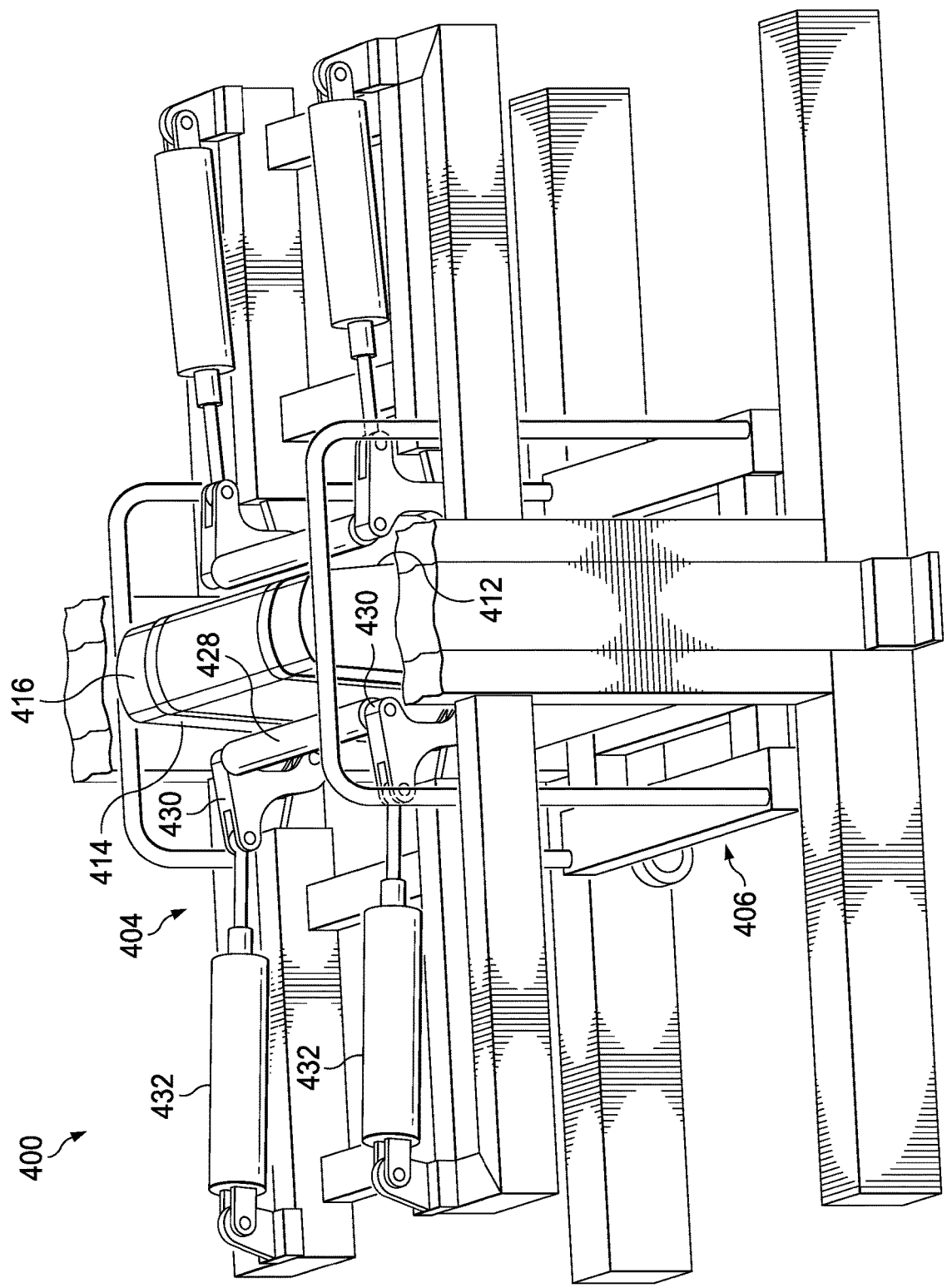
FIG. 21 is a partial view of the composite manufacturing system of FIG. 7 more clearly showing a second roller located relative to a tool.
Figure 22:
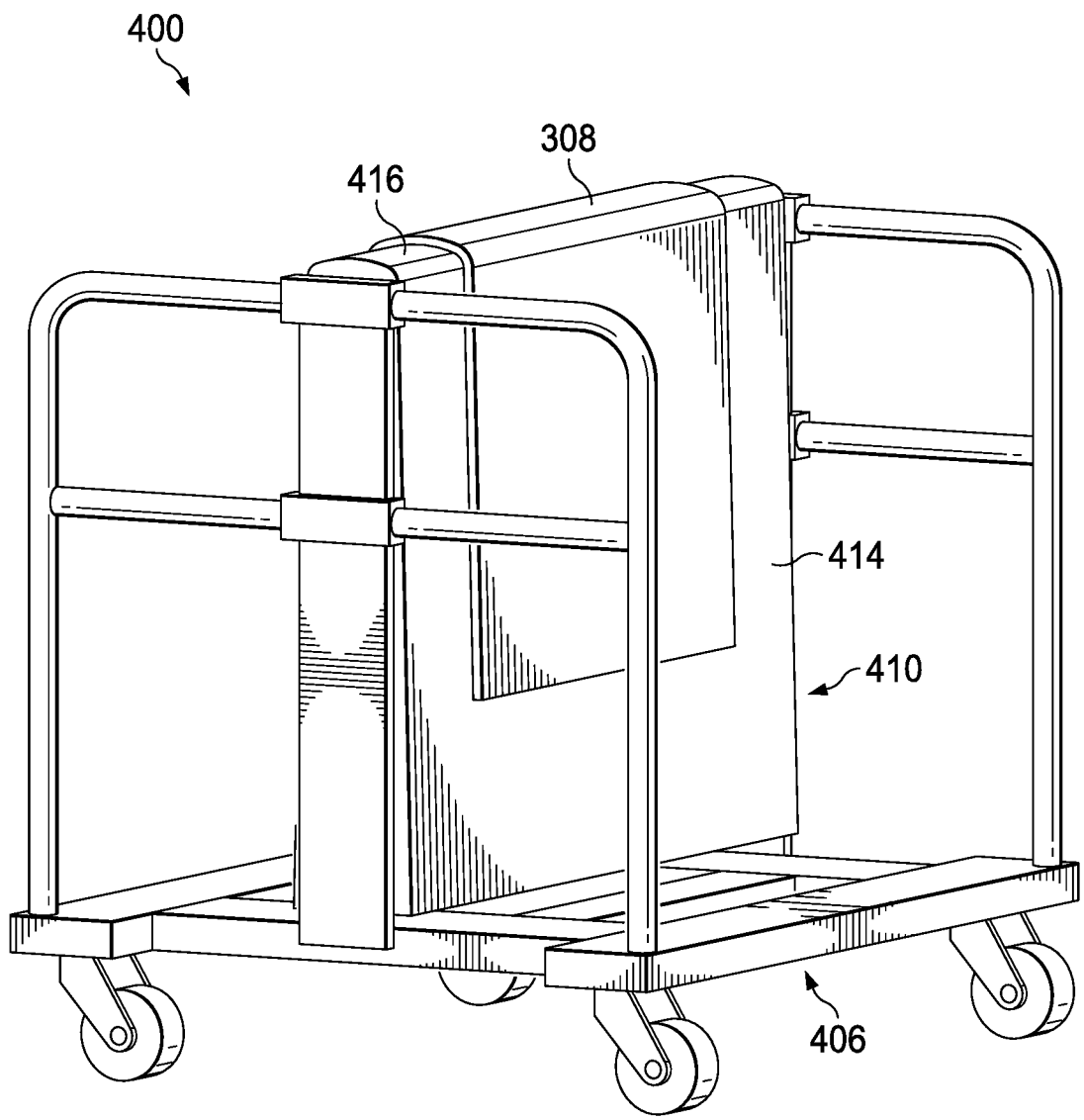
FIG. 22 is a partial view of the composite manufacturing system of FIG. 7 more clearly showing that a stand 406 is removable relative to the remainder of the composite manufacturing system.

FIGS. 16-18 show that the first carriage 420 may reach a lowest vertical location where the first roller 426 has applied pressure to all of the material laid on the first portion 412 before the second carriage 422 reaches a similar lowest vertical location where the second roller 428 has applied pressure to all of the material laid on the second portion 414. In some cases, the vertical offset between application of the first roller 426 and the second roller 428 can be helpful in preventing slippage of the material relative to the tool 410 and/or other material layers by ensuring that a sufficient surface area of the material being applied has been securely stuck to the tool 410 and/or the previously laid material layers. In some embodiments, the rollers 426, 428 can each apply about 1,000 lbf to the material layers as the rollers 426, 428 are moved vertically downward. In some cases, in addition to compacting the material layers, the above-described rolling action can force removal of air that may otherwise have been trapped beneath the material layer being applied. In some embodiments, a layer of copper-mesh embedded material may be placed on top of the carbon layers of the part blank 308. The copper-mesh layer may be installed in order to prevent damage if lightning were to strike rotorcraft 101 or 201. FIGS. 19 and 20 are provided to more clearly show the location of the tool 410 within the machine 404. FIG. 21 is provided to more clearly show the second carriage 422 relative to the tool 410 during a rolling action. FIG. 22 is provided to show that the stand 406 is removable from the machine 404 so that once the part blank 308 has been created, the part blank 308 can be left in place on the tool 410 and rolled into an autoclave where the part blank 308 can be cured using heat and pressure. After the part blank 308 is cured, the part blank 308 can be removed from the tool 410 and machined as needed to produce desired parts, such as one or more grips 305. The above-described process of laying material layers on the tool 410 can be repeated as many times as desirable to build up a desired part blank 308.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A composite manufacturing system, comprising:
    a tool comprising a substantially planar first portion and a substantially planar second portion;
    a first carriage configured to carry a first roller that is configured to selectively apply pressure to the first portion;
    a second carriage configured to carry a second roller that is configured to selectively apply pressure to the second portion; and
    wherein the first carriage and the second carriage are movable relative to the tool;
    wherein the first carriage and the second carriage are independently vertically movable relative to the tool; and
    wherein the first carriage and the second carriage are restricted to vertical movements.

2. The composite manufacturing system of claim 1, further comprising:
    at least one first actuator connected between the first carriage and the first roller; and
    at least one second actuator connected between the second carriage and the second roller.

3. The composite manufacturing system of claim 1, wherein the tool comprises a curved portion joining the first portion to the second portion.

4. The composite manufacturing system of claim 3, wherein the first roller is configured to selectively apply pressure to the curved portion prior to applying pressure to the first portion.

5. The composite manufacturing system of claim 4, wherein the first carriage is movable relative to the tool and wherein the first roller is configured to continually apply pressure to the tool while the first carriage is moved vertically downward.

6. The composite manufacturing system of claim 5, wherein the vertically downward movement causes the first roller to transition from applying pressure to the curved portion to the first portion.

7. The composite manufacturing system of claim 5, wherein the first roller is configured to apply pressure to the tool at a first vertical location along the tool while the second roller is configured to apply pressure to the tool at a higher second vertical location along the tool.

8. The composite manufacturing system of claim 5, wherein an exterior of the tool is substantially U-shaped and wherein at least one of the first roller and the second roller is configured to selectively apply pressure to more than half of the curved portion.

9. The composite manufacturing system of claim 8, wherein a pivot block is connected between a first actuator and the first roller to allow a change in distance between the first roller and the tool.

* * * * *